April 2, 1929. B. GOULD 1,707,550
MIXING MACHINE
Filed Dec. 20, 1927
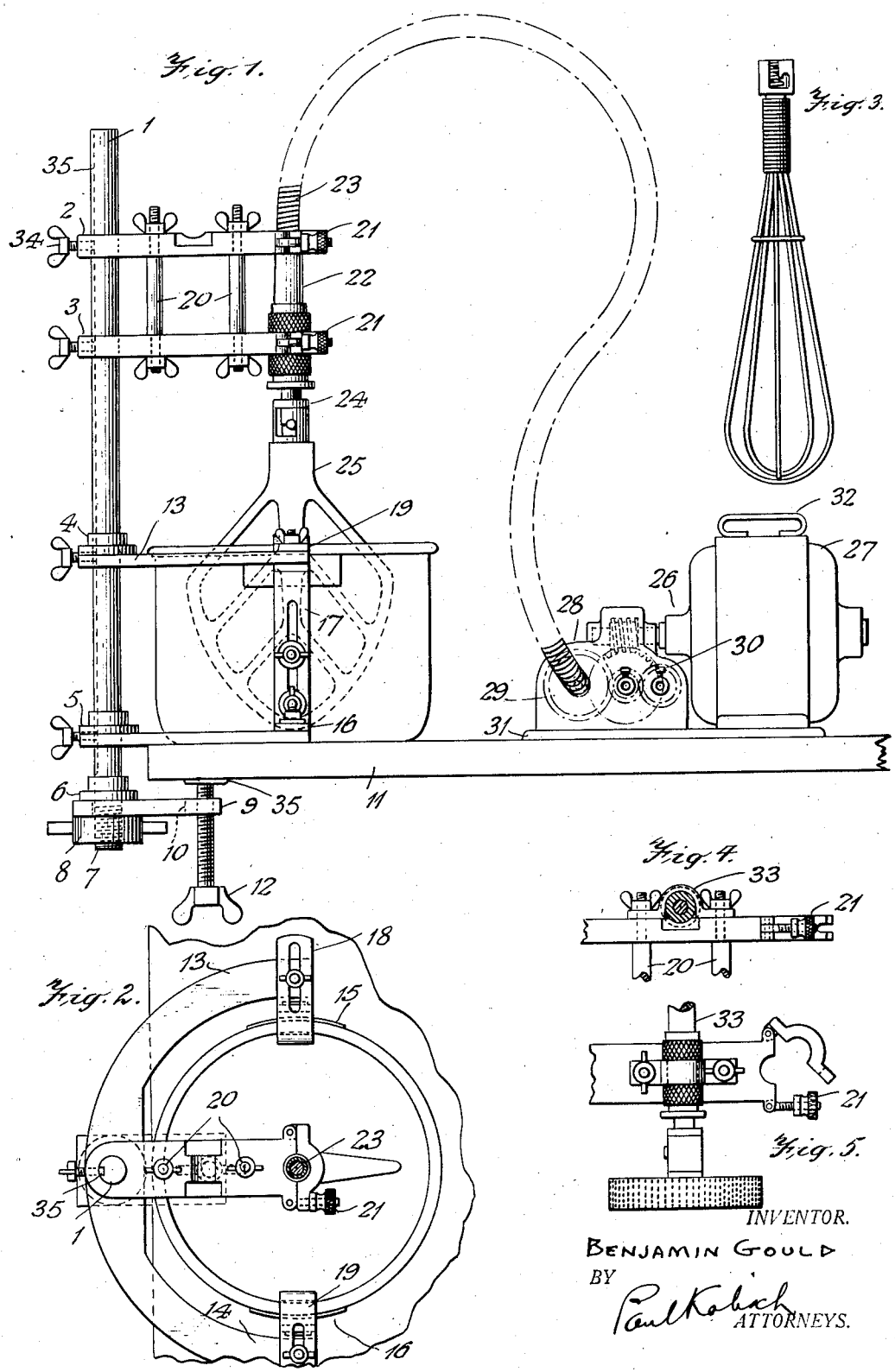

Patented Apr. 2, 1929.

1,707,550

UNITED STATES PATENT OFFICE.

BENJAMIN GOULD, OF BROOKLYN, NEW YORK.

MIXING MACHINE.

Application filed December 20, 1927. Serial No. 241,327.

This invention relates to mixing machines, more particularly to the type of mixing machines used in the kitchen for mixing dough and the like.

An object of the invention is the provision of an improved form of mixing machine which is light, easily portable, and fashioned in such manner that it can be taken apart for storage in a drawer or other small space.

Another object is the provision of a mixing machine having a stand for holding a mixing bowl, the power being supplied to said stand through a flexible drive shaft connected with a portable power unit.

A further object of the invention is the provision of a motor driven mixing machine so arranged that if desirable a portion of the machine can be used for the performance of other acts than mixing, that is to say, a machine which can be used not only for mixing dough and the like, but also can be used for buffing silver and sharpening knives or doing other similar acts.

In the drawings, Fig. 1 illustrates a mixing machine constructed in accordance with my invention.

Fig. 2 is a plan view of the machine shown in Fig. 1.

Fig. 3 shows a modified form of tool for use with the machine.

Figs. 4 and 5 illustrate one manner of connecting accessories to the mixing machine.

Referring to the drawings, reference numeral 1 indicates a standard having slidably mounted thereon a plurality of arms 2, 3, 4 and 5, which may be held in any given position by means of thumb screws 34, which cooperate with a channel 35 cut in the standard, and having at its lower end a flange 6, secured to the standard. This flange 6 is secured to the shaft by suitable means, such as screw threads, or is made integral therewith. The end of the standard is threaded at 7 for the reception of a nut 8. Positioned between the flange 6 and the nut 8 is a slidable plate 9 which has an elongated slot 10 therein. This slot permits the plate to be moved relatively to the standard. Arm 5 constitutes a combined mixing bowl holder and a table clamping member. This arm 5 rests on the top of a table such as 11 and cooperates with the plate 9 through the agency of a thumb screw 12, to hold the standard 1 rigidly positioned with relation to the table. In order to provide a bearing surface for the end of screw 12 and to prevent injury to the table a plate 35 may be positioned between the screw and the table. When it is necessary to clamp the standard to a table having but a very narrow free edge portion the nut 8 is unscrewed and the plate 9 slid in a left-hand direction to bring the thumb screw 12 closer to the standard, while if the table has a wide free edge the plate is moved in a right-handed direction in order to give better clamping action. It will be noted also that the plate can be rotated around the standard 1 as a center, thus permitting various adjustments to be made to the clamping apparatus as the particular conditions demand.

Secured to the ends 13 and 14 of the arm 5 are a pair of clamping fingers 15 and 16. Each of these fingers comprise two portions, a right angle member 16 and a gripping member 17. The right angle member is secured to the arm by means of a bolt and wing nut positioned in an elongated slot in the member, while the gripping member is attached to the right angle member by similar bolt and wing nut working in a similar slot. The function of the slots is to permit adjustment of the clamping fingers with relation to a mixing bowl, thus permitting the gripping of mixing bowls of various diameters and heights. Arm 4 is substantially similar to arm 5 except that slightly different gripping fingers are used. These fingers are made in the form of clamps, as shown at 18 and 19, which project downwardly over the top edge of a mixing bowl and hold the same rigidly in position. These clamps are also provided with elongated slots for adjustment purposes and are secured to the ends of the arm 4 by means of bolts and wing nuts. In order to clamp a mixing bowl by means of the gripping fingers 18 and 19 it is necessary merely to adjust the distance between the clamping edges of the gripping fingers to the diameter of the mixing bowl and to raise or lower the arm 4 by loosening said bolts and wing nuts, to position the gripping fingers over the top of the mixing bowl. This may be done by raising the arm 4, slipping the bowl into place under the arm, then lowering the arm and clamping the same in position. Either arm 4 or arm 5 may be used alone or the two may be used together if desired.

Arms 2 and 3 which are slidably mounted on the standard 1 in a similar manner to arms 4 and 5, are secured together intermediate their ends through the agency of a pair of spacer bolts 20 which hold the arms together by means of wing nuts. Attached to the end of each of the arms 2 and 3 is a hinge clamping member 21. These hinge clamping members are held in a closed position by means of knurled nuts which provide for the easy opening of the clamping member. Positioned against the end of the arms 2 and 3 and held in position by the clamping members 21 is the end 22 of a flexible drive shaft 23 which has on its end a connection 24 for holding in position a mixing beater, or similar tool, 25. The other end of drive shaft 23 is connected to a power unit 26. This power unit comprises a motor 27 and a transmission 28. The transmission 28 comprises a plurality of gear interconnected rotatable shafts driven by the motor 27 and rotating at different speeds. The end of the drive shaft 23 is provided with suitable connecting means which may be thrust into the side of the housing of the transmission, as shown at 29 to connect in any well known manner with any desired one of the rotating shafts. Suitable means are provided for preventing the drive shaft from slipping out of engagement with the transmission unit, such, for example, as a thumb screw, as shown at 20 or by a bayonet connection such as shown at 24. Both the motor 27 and the transmission 28 are mounted on a base plate 31 to form a unit and a handle 32 is provided at some convenient place such as the top of the motor, as shown, for the transportation of the power unit. By this arrangement the mixing unit may be positioned on a table or shelf wherever desired, and the motor unit may be positioned at some convenient place, either near to the mixing unit or some distance away therefrom.

The mixing beater or tool 25 can be easily removed from the end of the shaft 23 in a well known manner, due to the construction of the connector 24 which may be of the bayonet type, as shown, or any other well known type. Various implements may be connected to the shaft according to the type of work to be done, for example, I have shown in Fig. 3 an implement suitable for whipping cream or the like. It is in connection with these different implements and the type of service for which they are adapted that the transmission comes into use. That is to say, where dough is to be mixed a beater such as 25 is connected to the flexible drive shaft, and the motor end of the said shaft is interconnected with one of the low speed shafts of the transmission. While, if it is desired to whip cream the implement shown in Fig. 3 would be used and the shaft 23 connected to a high speed shaft of the transmission 28. By way of example, the speed of the motor might be made 1800 revolutions a minute and the various speeds of the transmission shafts 75, 200 and 400 thereabouts. The lower speeds would be used for mixing heavy materials while the higher speeds might be used for beating fluid mixtures.

In place of the mixing beater 25 might also be used a drill for boring holes, or a grinding or buffing wheel. Likewise, in place of the mixing bowl and mixing beater, an ice cream freezer might be substituted, in which case the connector 24 could be attached to the moving part of the freezer. Should extremely low speeds be found desirable for use with ice cream freezers a suitable low speed shaft might be provided in the transmission 28. In order to permit the clamping of the shaft 23 at right angles so that a buffing wheel or grinding wheel might be more advantageously used an auxiliary clamp 33 is provided on the top of arm 2. For the sake of convenience this clamp has been made to cooperate with the ends of the spacer bolts 20. In this case the wing nuts used for holding the spacer bolts are also used for holding the auxiliary clamp.

From the above description it will be seen that I have provided a mixing machine which can be readily stored away in a small space. The power unit being transportable as a whole, it can be placed away in some corner or closet, the shaft 23 removed from the transmission and mixing unit and coiled up, while arms 2, 3, 4 and 5 can be slipped off from the standard merely by unloosening the thumb screws, the plate 10 detached from the standard by unscrewing the nut 8 and the various clamping fingers taken apart by removing their various bolts and wing nuts. Likewise, if desirable, the two clamping members 2 and 3 can be separated by removing the nuts from the spacer bolts 20. This separable structure permits the entire mixing unit to be reduced to a plurality of substantially flat individual pieces which can be easily stored away in some small space such as a table drawer, thus obviating the necessity of a special storeroom for the mixing machine.

While I have described for the purpose of illustration one particular form that the invention may take, it is to be understood that various modifications and adaptations such as would occur to one skilled in the art may be used without a departure from the spirit of the invention, as set forth in the appended claims.

What I claim is:

1. In a mixing machine, a mixing unit and a power unit, a flexible drive shaft, means on the said mixing unit for rigidly clamping one end of said drive shaft and means on the said power unit for operatively interconnecting with said drive shaft.

2. In a mixing unit, a standard and a plurality of arms adjustably secured thereto, one of said arms having gripping means tightly to hold the end of a flexible power drive shaft, another of said arms serving to hold in position a mixing bowl and a third of said arms serving, in cooperation with a thumb screw, as a clamping means for clamping the standard to a table.

3. In a mixing unit, a standard, an arm adjustably secured to said standard and adapted to extend partially around a mixing bowl, said arm having a pair of clamps secured thereto, said clamps being adjustable horizontally and vertically and serving to grip the mixing bowl.

4. In mixing unit, a standard, an arm slidably mounted on said standard, said arm having secured to one end thereof a clamping member, said clamping member serving tightly to grip the end of a flexible drive shaft and hold the same free from vibration.

5. In a mixing unit, a standard and an arm secured to said standard, said arm having attached thereto a plurality of clamping means, one of said clamping means serving to secure a flexible drive shaft in a vertical position and another of said clamping means serving to secure said shaft in another position.

6. In a household mixing machine, a mixing unit and a high speed power unit, a reduction gear mechanism forming part of one of said units, a driven member on said mixing unit, means for detachably coupling a flexible drive shaft to said driven member and to said power unit and means for rigidly clamping said flexible drive shaft in operative position with respect to said driven member.

In testimony whereof, I have signed my name to this specification, this 19th day of December, 1927.

BENJAMIN GOULD.